US009043323B2

(12) United States Patent
Kalra et al.

(10) Patent No.: US 9,043,323 B2
(45) Date of Patent: May 26, 2015

(54) METHOD AND APPARATUS FOR PROVIDING SEARCH WITH CONTEXTUAL PROCESSING

(75) Inventors: Pavandeep Kalra, Shrewsbury, MA (US); Sergey Boldyrev, Söderkulla (FI)

(73) Assignee: Nokia Corporation, Espoo (FI)

( * ) Notice: Subject to any disclaimer, the term of this patent is extended or adjusted under 35 U.S.C. 154(b) by 692 days.

(21) Appl. No.: 13/214,623

(22) Filed: Aug. 22, 2011

(65) Prior Publication Data

US 2013/0054584 A1    Feb. 28, 2013

(51) Int. Cl.
G06F 17/30    (2006.01)

(52) U.S. Cl.
CPC ................... *G06F 17/3087* (2013.01)

(58) Field of Classification Search
CPC ................................. G06F 17/30864
See application file for complete search history.

(56) References Cited

U.S. PATENT DOCUMENTS

| | | | |
|---|---|---|---|
| 5,920,857 A * | 7/1999 | Rishe et al. ........................... 1/1 |
| 2007/0018953 A1* | 1/2007 | Kipersztok .................. 345/156 |
| 2007/0174290 A1* | 7/2007 | Narang et al. .................. 707/10 |
| 2007/0219957 A1* | 9/2007 | D'Hers et al. .................... 707/3 |
| 2007/0255735 A1 | 11/2007 | Taylor et al. |
| 2010/0017366 A1 | 1/2010 | Robertson et al. |
| 2010/0046761 A1 | 2/2010 | Henn et al. |
| 2010/0057728 A1 | 3/2010 | Quick et al. |
| 2010/0153488 A1 | 6/2010 | Mittal et al. |
| 2010/0161591 A1* | 6/2010 | Jones et al. .................... 707/722 |
| 2011/0225180 A1* | 9/2011 | Liao et al. ..................... 707/769 |
| 2011/0320498 A1* | 12/2011 | Flor .............................. 707/797 |

OTHER PUBLICATIONS

Mell, Peter, et al., The NIST Definition of Cloud Computing (Draft) Recommendations of the National Institute of Standards and Technology, U.S. Dept. of Commerce, Jan. 2011, pp. 1-7.
Notification of Transmittal of the International Search Report and the Written Opinion of the International Searching Authority, or the Declaration for International Application No. PCT/FI2012/050766, dated Feb. 7, 2013, pp. 1-14.
S. Boldyrev et al., "Network and content aware information management," conference publication, International Conference for Internet Technology and Secured Transactions, 2009, pp. 1-7.

* cited by examiner

*Primary Examiner* — Mohammad S Rostami
(74) *Attorney, Agent, or Firm* — Ditthavong & Steiner, P.C.

(57) ABSTRACT

An approach is provided for providing search with contextual processing. A contextual search platform processes and/or facilitates a processing of one or more data requests data to generate at least one query. The contextual search platform further determines one or more algorithms for bounding, at least in part, result data responsive to the one or more data requests, the at least one query, or a combination thereof. The contextual search platform also causes, at least in part, an association of the one or more algorithms with the at least one query.

18 Claims, 13 Drawing Sheets

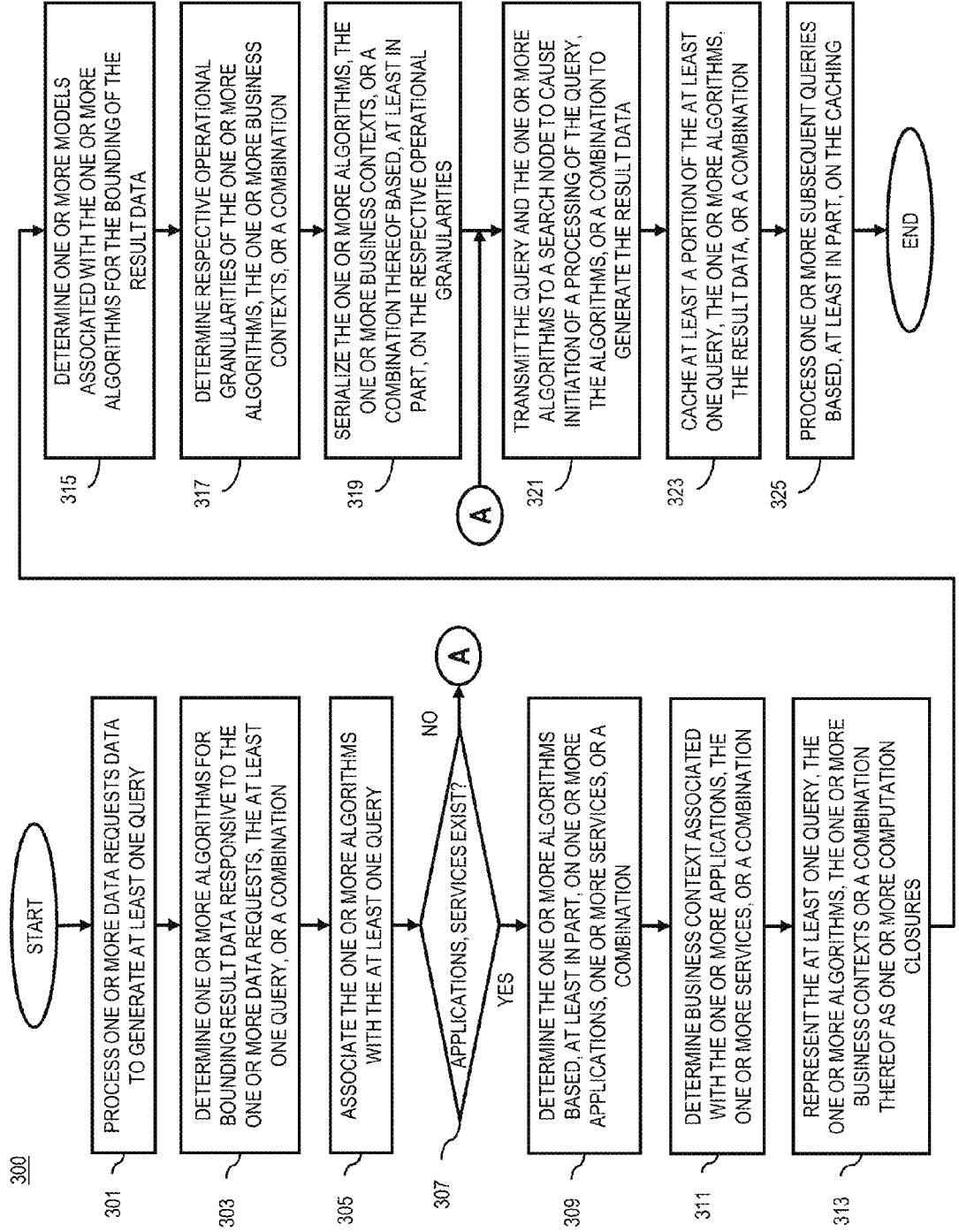

METHOD AND APPARATUS FOR PROVIDING SEARCH WITH CONTEXTUAL PROCESSING

BACKGROUND

Service providers (e.g., wireless, cellular, etc.) and device manufacturers are continually challenged to deliver value and convenience to consumers by, for example, providing compelling network services. These services are leading to vast amounts of data (structured and binary) which need to be managed, stored, searched, analyzed, etc. A recent popular application is delivering services to a user of a wireless device based on the device's location, and many mobile devices include Global Positioning System (GPS) receivers that provide geo-location of the device or provide information to the device user around a certain location. More recently location based services, such as geo-spatial searches, have become very prominent by providing value to the user, based on their location. Current geo-spatial services provide information search results based on distance from one or more locations, using bounding box filters that search matches within a specific area. However, with recent advances in navigation services, the capabilities of bounding box filtering are not sufficient for users' navigation needs involving specific business contexts such as, for example, linear searches along a certain stretch of a road, a power line, a river, etc.

SOME EXAMPLE EMBODIMENTS

Therefore, there is a need for an approach for providing search with contextual processing.

According to one embodiment, a method comprises processing and/or facilitating a processing of one or more data requests data to generate at least one query. The method also comprises determining one or more algorithms for bounding, at least in part, result data responsive to the one or more data requests, the at least one query, or a combination thereof. The method further comprises causing, at least in part, an association of the one or more algorithms with the at least one query.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more data requests data to generate at least one query. The apparatus is also caused to determine one or more algorithms for bounding, at least in part, result data responsive to the one or more data requests, the at least one query, or a combination thereof. The apparatus is further caused to cause, at least in part, an association of the one or more algorithms with the at least one query.

According to another embodiment, a computer-readable storage medium carries one or more sequences of one or more instructions which, when executed by one or more processors, cause, at least in part, an apparatus to process and/or facilitate a processing of one or more data requests data to generate at least one query. The apparatus is also caused to determine one or more algorithms for bounding, at least in part, result data responsive to the one or more data requests, the at least one query, or a combination thereof. The apparatus is further caused to cause, at least in part, an association of the one or more algorithms with the at least one query.

According to another embodiment, an apparatus comprises means for processing and/or facilitating a processing of one or more data requests data to generate at least one query. The apparatus also comprises means for determining one or more algorithms for bounding, at least in part, result data responsive to the one or more data requests, the at least one query, or a combination thereof. The apparatus further comprises means for causing, at least in part, an association of the one or more algorithms with the at least one query.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a flowchart of a process for providing search with contextual processing, according to one embodiment;

DESCRIPTION OF SOME EMBODIMENTS

Figure 1:
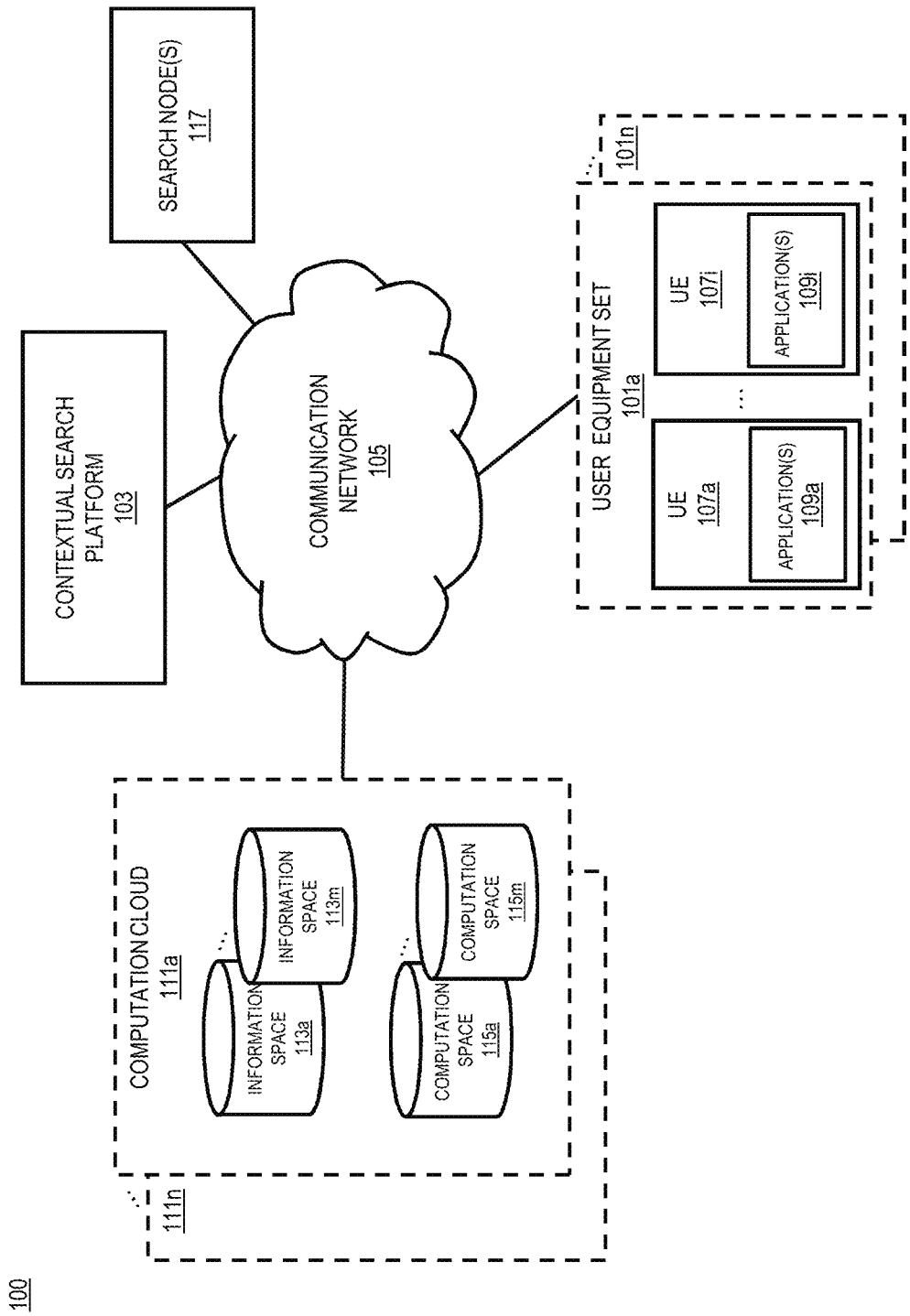
FIG. 1 is a diagram of a system capable of providing search with contextual processing, according to one embodiment.

Examples of a method, apparatus, and computer program for providing search with contextual processing are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "computation closure" identifies a particular computation procedure together with relations and communications among various processes including passing arguments, sharing process results, selecting results provided from computation of alternative inputs, flow of data and process results, etc. The computation closures (e.g., a granular reflective set of instructions, data, and/or related execution context or state) provide the capability of slicing of computations for processes and transmitting the computation slices between devices, infrastructures and information sources.

As used herein, the term "cloud" refers to an aggregated set of information and computation closures from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats. Although various embodiments are described with respect to clouds, it is contemplated that the approach described herein may be used with other structures and conceptual description methods used to create distributed models of information and computations.

In one embodiment, according to a definition by the National Institute of Standards and Technology (NIST) (see "The NIST Definition of Cloud Computing (Draft)," Mell, P. and Grance, T., January 2011, NIST, U.S. Department of Commerce, Special Publication 800-145 (Draft)), cloud computing is a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is composed of five essential characteristics, three service models, and four deployment models. The essential characteristics of the cloud model consist of on-demand self-service, broad network access, resource pooling, rapid elasticity, and measured Service.

The on-demand self-service characteristic of the cloud model enables a consumer to unilaterally provision computing capabilities, such as server time and network storage, as needed automatically without requiring human interaction with each service's provider.

The broad network access characteristic of the cloud model provides capabilities available over the network that can be accessed through standard mechanisms that promote use by heterogeneous thin or thick client platforms (e.g., mobile phones, laptops, and PDAs).

Based on the resource pooling characteristic of the cloud model, the provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

The rapid elasticity of the cloud model provides rapid and elastic, and in some cases automatic, provision of capabilities to quickly scale out and rapid release to quickly scale in. To the consumer, the capabilities available for provisioning often appear to be unlimited and can be purchased in any quantity at any time.

According to the measured service characteristic, cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Furthermore, the service models associated with the cloud model include Cloud Software as a Service (SaaS), Cloud Platform as a Service (PaaS), and Cloud Infrastructure as a Service (IaaS).

The Cloud Software as a Service (SaaS) provides, to the customer, the capability to use the provider's applications running on a cloud infrastructure. The applications are accessible from various client devices through a thin client interface such as a web browser (e.g., web-based email). According to this service model, the consumer does not manage or control the underlying cloud infrastructure including network, servers, operating systems, storage, or even individual application capabilities, with the possible exception of limited user-specific application configuration settings.

The Cloud Platform as a Service (PaaS) provides, to the customer, the capability to deploy onto the cloud infrastructure consumer-created or acquired applications created using programming languages and tools supported by the provider. According to this service model, the consumer does not manage or control the underlying cloud infrastructure including network, servers, operating systems, or storage, but has control over the deployed applications and possibly application hosting environment configurations.

The Cloud Infrastructure as a Service (IaaS) provides, to the customer, the capability to provision processing, storage, networks, and other fundamental computing resources where the consumer is able to deploy and run arbitrary software, which can include operating systems and applications. According to this service model, the consumer does not manage or control the underlying cloud infrastructure but has control over operating systems, storage, deployed applications, and possibly limited control of select networking components (e.g., host firewalls).

Additionally, a cloud model can be deployed as a private cloud, a community cloud, a public cloud, or a hybrid cloud. In one embodiment, according to a private cloud model, the cloud infrastructure is operated solely for an organization. It may be managed by the organization or a third party and may exist on premise or off premise. Alternatively, a community cloud infrastructure is shared by several organizations and supports a specific community that has shared concerns (e.g., mission, security requirements, policy, and compliance considerations). It may be managed by the organizations or a third party and may exist on premise or off premise. A public cloud infrastructure is made available to the general public or a large industry group and is owned by an organization selling cloud services. Finally, a hybrid cloud infrastructure is a composition of two or more clouds (private, community, or public) that remain unique entities but are bound together by standardized or proprietary technology that enables data and application portability (e.g., cloud bursting for load-balancing between clouds).

FIG. 1 is a diagram of a system capable of providing search with contextual processing, according to one embodiment. The geo-spatial index searches currently offered to mobile users via their devices are designed based on paradigms such as combining spatial data with related text in a single search, calculating distance between one or more points and one or more other points, filtering the data using bounding boxes, wherein one or more specific areas are searched for matches, sorting search results based on distances from specified points, etc. These search methods use distance as a boost factor in the relevancy score of a search result, while allowing other factors to play a role as well.

However there are search cases that require results much different than what bounding box method can provide. For example, in one embodiment, a user may need information related to traffic in a five miles stretch on a highway from point A to point B. In order to provide the requested information, the related application can do bounding box search multiple times and aggregate the results to present to the user. This requires aggregation layer capabilities on the application side which the underlying geo-spatial search is unable to understand.

In another embodiment, a user may want to find businesses having certain properties (e.g. discounts, reviews, etc.) on the stretch of a specific road. However, as previously discussed, current standard geo-spatial search methods provide results to user requests by creating bounding boxes which are squares around the particular point the user is searching on and the user will get all the points that he/she is looking for and then the user can sort the data based on various criteria for example based on number of stars reviewers have given the business, comments from reviewers, etc. Alternatively, a geo-spatial search method may include radius search around the particular search point. There are many open source tools for these kinds of search.

However, in many occasions bounding box search or radius search are not sufficient for answering user queries. For example, if a user is trying to find traffic on highway H in an M miles stretch, what the application has to do is to create a bounding box which has a circumference along the highway H and it will also have to create many bounding boxes on the M miles stretch to actually get the traffic situation through those bounding boxes. Upon retrieving the traffic information, an information aggregation is done in order to get a holistic picture of the traffic within the M miles stretch of the highway H. This is because the retrieved traffic information on a highway will not be through the whole road stretch that the user needs and if the user is travelling across multiple highways within a small stretch, since highways bend in different directions, the application will have to do lots of different searches automatically and then pull them all together. These applications use various kinds of aggregation logic to aggregate the query results. However, radius and bounding box searches, which today are standard search methods, are not sufficient for queries such as the above example.

Base on the bounding box search method, the bounding boxes may be around the M miles stretch or may consider alternate routes. The application my divide up the M miles stretch into M one mile radius searches. Additionally, since there are curves on a road, the radius points identified by the radius method need to be constantly updated. For example, circular searches for traffic events may be done along the road stretch from south to north-east and then the traffic events are aggregated to get a complete picture of the traffic situations on that road. For alternate routes, a wider search may be done (e.g., 3 miles radius each), and across multiple roads at the same time.

It is clear from the above examples that one bounding box or one radius search will not be able to provide the results to user's request. On the contrary, the searches have to be repeated many times, depending on what the user is looking for such as, for example, traffic on their route, alternative routes with less traffic, etc. Furthermore, the results from many searches should be aggregated for generating a combined search results.

To address this problem, a system 100 of FIG. 1 introduces the capability to provide search with contextual processing.

In one embodiment, the business contexts associated with applications 109a-109i of User Equipments (UEs) 107a-107i of UE sets 101a-101n is plugged into the geo-spatial search by search nodes 117 while the search process is taking place. This can lead to lowering the complexity on the applications 109a-109i side, and more importantly the search nodes 117 can use the business contexts to optimize the geo-spatial search, while it is underway, to provide only relevant results to the user of UEs 107a-107i.

However, despite the fact that search can be bounded with business logic and distributed with different granularity, still there is a challenge to achieve scalable contextual information processing within heterogeneous environments such as computation clouds 111a-111n. Therefore the main challenge is to create such adaptive computing platform that provides granular and reflective business logic and corresponding computational balancing capability for a contextual search platform 103 to enhance the information processing power of the search nodes 117 as it interacts with various external information providers, clouds 111a-111n, etc.

In one embodiment, an application 109a-109i knows what the user of UE 107a-107i is looking for, however, if this knowledge is transferred to the contextual search platform 103, the hook points (e.g. function calls, events, messages, etc. that are used to intercept business contexts into the search) can be used by various services, including new services that are being introduced. This will lead to an optimal search by the search nodes 117.

In another embodiment, an application 109a-109i is capable of performing result aggregation. As a result, when a new service provided to UEs 107a-107i via geo-spatial search by search nodes 117, the application 109a-109i can merge and aggregate all the results produced. Typically, search nodes 117 associated with map operating systems perform radius or bounding box searches but most of the process is performed by the application 109a-109i. However, in this embodiment, a generic way for providing search services is presented that leverages the search to the contextual search platform 103.

In one embodiment, business context is sent from applications 109a-109i to the actual search nodes 117 rather than the aggregation nodes that process queries. Furthermore, a contextual search platform 103 may as well be equipped with aggregation layers of its own.

In one embodiment, the business context can be decomposed to (characterized by) certain amounts of data and the relevant computations, by the contextual search platform 103. The business context data is decomposed into its primitive components that can be accessed by the application 109a-109i, the contextual search platform 103, or a combination thereof. The decomposed computations can be serialized into certain forms and formats. For applicability to most of the existing platforms in the industry, the format of the computations can be any standard widely used format, such as for example RDF, Raw XML, etc.

In one embodiment, the data accompanying the computations can include map related data, corresponding layering such as points of interests, roads, etc., represented through various graphs. The data is serialized and represented in certain data management systems in cloud environments 111a-111n usually in RDF or a similar format.

In one embodiment, by combining different layers, business context (decomposed to computation primitives and relevant data) can be combined with representation of the geo-spatial data which is embedded or represented by map information such as Point of Interest (POI) metadata, road representation data, etc. As a result, the process for providing results to a user query remains independent from facts such as where the actual search is taking place (in a search node 117, in one or more clouds 111a-111n, or a combination thereof) or where the aggregation is nominated to (applications 109a-109i, clouds 111a-111n, etc.) In this embodiment, the query results are provided based on a set of serialized computations, in computation spaces 1115a-115m, and related data, in information spaces 113a-113m, in a specific format (e.g., RDF). Additionally, search nodes 117 are able to create more efficient queries compared to the multiple bounding boxes typically used.

As shown in FIG. 1, the system 100 comprises sets 101a-101n of user equipments (UEs) 107a0197i having connectivity to the contextual search platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the granular and reflective representation of operational context allows real-time data integration across various data providers. This integration can be used for providing dynamic data models, flexible clustering/partitioning, etc. Additionally, the geo-spatial integration in granular and reflective representation enables mashup or combination of data, presentation or functionality across multiple sources of geo-spatially aware data sets along with the operational context (e.g. business context) for example in social networking applications, cross-organizational data platforms, logistics, command and control sources.

In one embodiment, structured (or binary) storage and in-place analytics processing provided by the contextual search platform 103 and by the information spaces 113a-113m of clouds 111a-111n with an ability to use business and situational context, provide real-time insight into the data. Such binding is based on the fact that the related computations in computation spaces 115a-115m can be presented as a part of the structured (or binary) data object. Therefore, the data and the computations can be serialized along with structured data object as annotation enclosed by granular and reflective run-time environment, wherein such run-time environment is based on computation closures and every process can be defined by a number of recombined computation closures or by a chain of computation closures. Additionally, applications 109a-109i can be defined as sets of computation closures with predefined functional flows. Therefore, the applications themselves can also be reflected onto run-time environment and vice versa.

By way of example, the UEs 107a-107i, and the contextual search platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
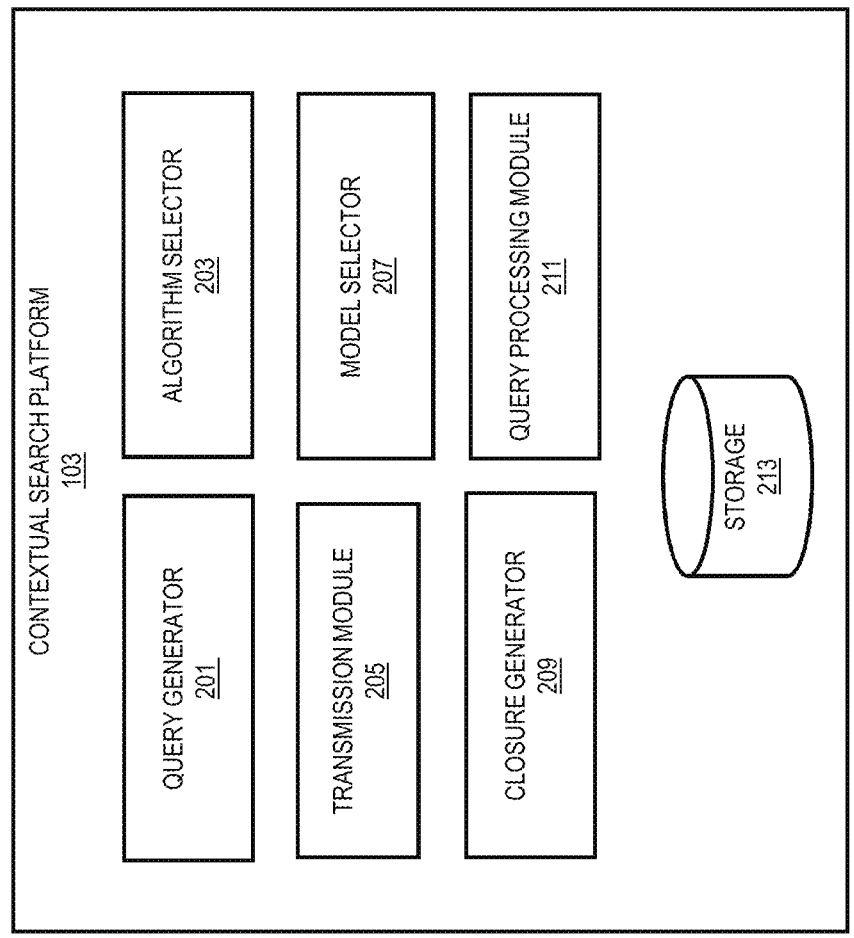
FIG. 2 is a diagram of the components of a contextual search platform, according to one embodiment.

FIG. 2 is a diagram of the components of a contextual search platform, according to one embodiment. By way of example, the contextual search platform 103 includes one or more components for providing search with contextual processing. It is contemplated that the functions of these components may be combined in one or more components or performed by other components of equivalent functionality. In this embodiment, the contextual search platform includes a query generator 201, an algorithm selector 203, a transmission module 205, a model selector 207, a closure generator 209, a query processing module 211, and a storage 213.

Figure 9:
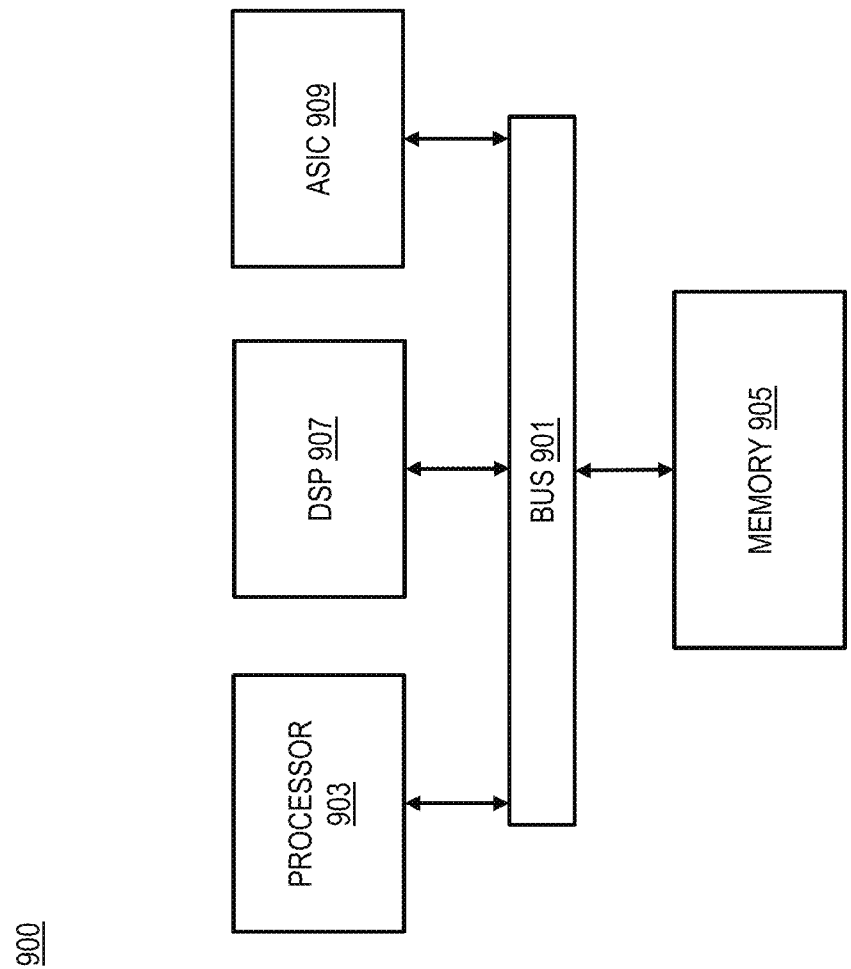
FIG. 9 is a diagram of a chip set that can be used to implement an embodiment of the invention.

FIG. 2 is described with reference to FIG. 3, wherein FIG. 3 shows a flowchart 300 of a process for providing search with contextual processing, according to one embodiment. In one embodiment, the contextual search platform 103 performs the process 300 and is implemented in, for instance, a chip set including a processor and a memory as shown in FIG. 9. In one embodiment, per step 301 of flowchart 300 of FIG. 3, the query generator 201 processes and/or facilitates a processing of one or more data requests data to generate at least one query. The one or more data requests may be received at the contextual search platform 103 from a UE 107*a*-107*i*. The query generator 201 may formulate the query from the received request data based on a predetermined query format.

In one embodiment, per step 303 of FIG. 3 the algorithm selector 203 determines one or more algorithms for bounding, at least in part, result data responsive to the one or more data requests, the at least one query, or a combination thereof. The algorithm selector 203 may analyze the request data, the query or a combination thereof to determine the algorithm for bounding the query results. The algorithm selector 203 may select one or more algorithms from an algorithm repository stored in storage 213, in clouds 111*a*-111*n*, or a combination thereof.

In one embodiment, per step 305 of FIG. 3, the algorithm selector 203 causes, at least in part, an association of the one or more determined algorithms with the at least one query. The queries and their associated algorithms may be stored in storage 213, in clouds 111*a*-111*n* or a combination thereof.

In one embodiment, per step 307 of FIG. 3, the algorithm selector 203 determines whether the data request is associated with one or more applications 109*a*-109*i*, one or more services, or a combination thereof of UE 107*a*-107*i*. If associated applications and/or services exist, per step 309 the algorithm selector 203 determines the one or more algorithms based, at least in part, on one or more applications 109*a*-109*i*, one or more services (not shown), or a combination thereof associated with the one or more data requests from UE 107*a*-107*i*, the at least one query generated by the query generator 201, or a combination thereof.

In one embodiment, per step 311 of FIG. 3, the algorithm selector 203 determines one or more business contexts associated with the one or more applications 109*a*-109*i*, the one or more services, or a combination thereof. The business contexts may be extracted from the applications 109*a*-109*i*, the services, etc. The one or more determined business contexts can be used for bounding the query result data.

In one embodiment, per step 313 of FIG. 3, the closure generator 209 causes, at least in part, a representation of the at least one query, the one or more algorithms, the one or more business contexts, or a combination thereof as one or more computation closures. The computation closures can be sent to clouds 111*a*-111*n* to be stored in the computation spaces 115*a*-115*m* and executed by processing entities within the environment of clouds 111*a*-111*n*. The one or more computation closures may comprise one or more functional flows defining, at least in part, the one or more applications 109*a*-109*i*, the one or more services, or a combination thereof.

In one embodiment, per step 315 of FIG. 3, the model selector 207 determines one or more models associated with the one or more algorithms for the bounding of the result data, wherein the one or more models represent, at least in part, one or more data transformations, one or more data extractions, one or more data loadings, or a combination thereof.

In one embodiment, per step 317 of FIG. 3, the closure generator 209 determining respective operational granularities of the one or more algorithms, the one or more business contexts, or a combination thereof. The operational granularities enables breaking down of processes into sets of primitive simpler processes that can be executed independently and in a distributed manner (e.g., on a cloud 111*a*-111*n*).

In one embodiment, per step 319 of FIG. 3, the closure generator 209 causes, at least in part, a serialization of the one or more algorithms, the one or more business contexts, or a combination thereof based, at least in part, on the respective operational granularities. The serialization process provides links and metadata that each operational granularity needs in order to be executed independently. The serialization also provides data for construction of final results based on the executed operational granularities.

In one embodiment, per step 321 of FIG. 3, the transmission module 205 causes, at least in part, a transmission of the query and the one or more algorithms to a search node 117 to cause, at least in part, an initiation of a processing of the at least one query, the one or more algorithms, or a combination thereof to generate the result data. The search node 117 may access the clouds 111*a*-111*n* in order to retrieve and use computation closures generated by the closure generator 209 and stored in computation spaces 115*a*-115*m*. The search node 117 may also determine related data from the information spaces 113*a*-113*m*.

In one embodiment, per step 323 of FIG. 3, the query processing module 211 causes, at least in part, a caching of at least a portion of the at least one query, the one or more algorithms, the result data, or a combination thereof. The cached data may be stored in storage 213.

In one embodiment, per step 325 of FIG. 3, the query processing module 211 processes and/or facilitates a processing of one or more subsequent queries based, at least in part, on the caching. In this embodiment, the cached queries and algorithms can be reused which will increase the efficiency. For example, if an application 109*a* is frequently used by a user of UE 107*a*, the cached queries and algorithms from earlier uses can be applied to next occasions of using the application without the need to be generated repeatedly.

In one embodiment, the at least one query is a geo-spatial search query.

Figure 4A:
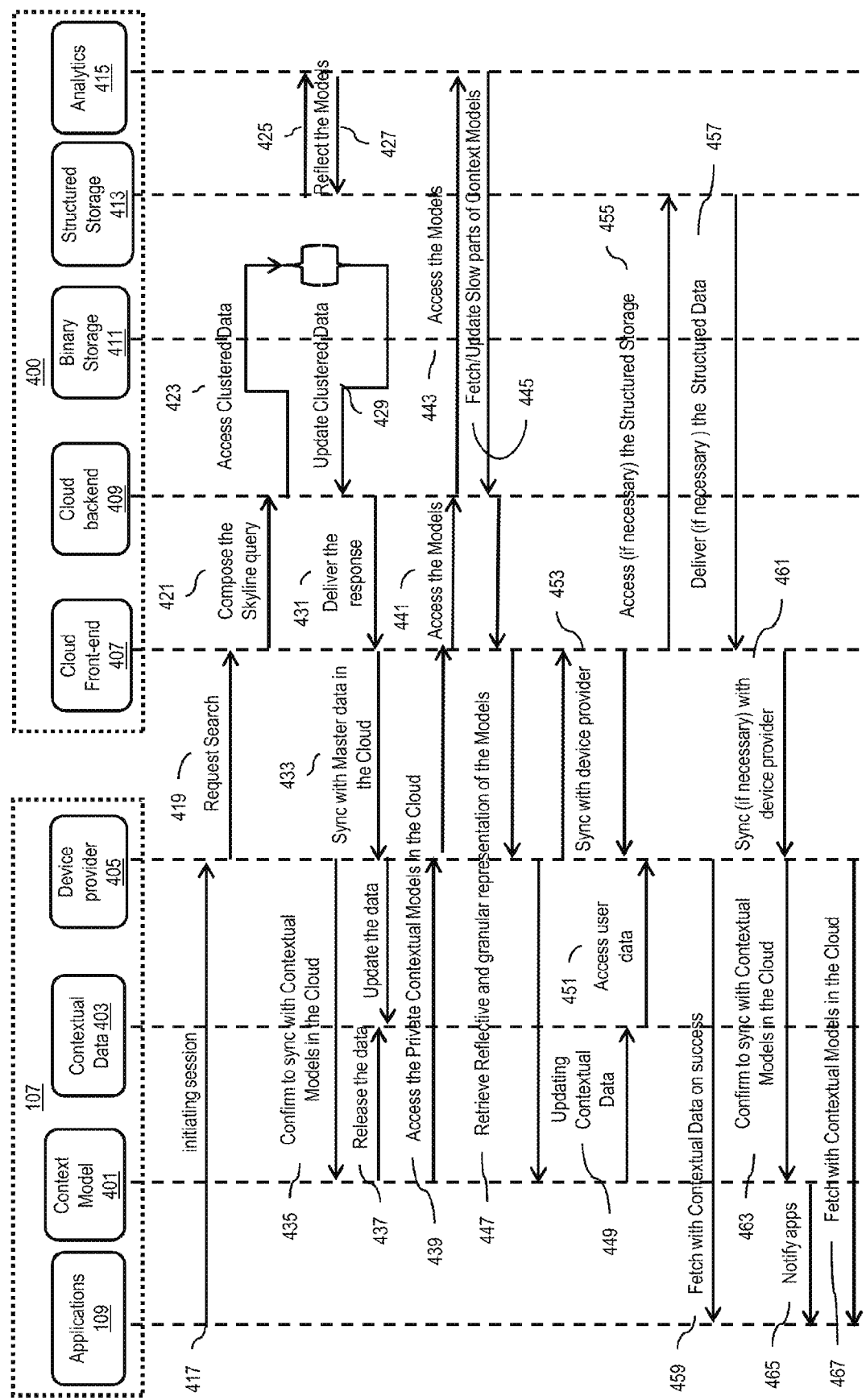
FIGS. 4A-4B are diagrams of contextual search, according to various embodiment.
Figure 4B:
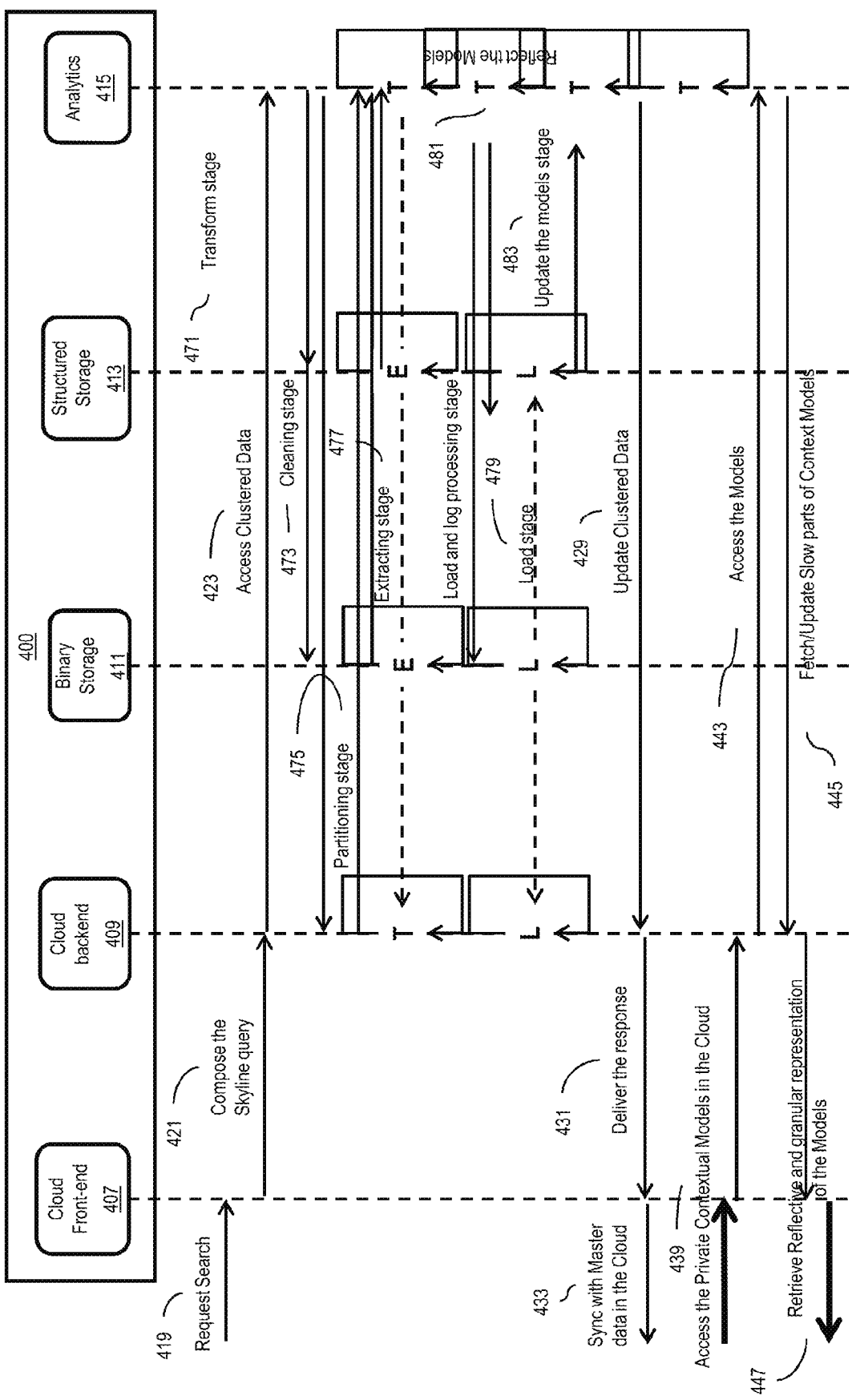

FIGS. 4A-4B are diagrams of contextual search, according to various embodiment. FIG. 4A is a diagram showing steps of searching with contextual processing. In one embodiment, a UE 107 consists of components such as applications 109, a context model 401 that determines the format and the representation of context associated with each application 109, the contextual data 403 that represents the data associated with the context for applications 109, and a device provider 405. Additionally, the backend 400 consists of clouds 111*a*-111*n*, contextual search platform 103, search nodes 117, or any other entities involved in search process that communicate with UE 107 via communication network 105. In this embodiment the backend 400 consists of components such as a cloud front-end 407 (which directly communicates with the UE 107), a cloud backend 409 (e.g., server), storage units binary storage 411 storing the machine code or the most elemental data items, and structured storage 411 storing the data structured into specific format (e.g., a data model associated with a database management system), and the analytics 415 which is an analysis component analyzing the data and obtaining optimal or realistic decisions based on existing data.

In one embodiment, per step 417 the application 109 initiates a search session via a device provider 405. The device provider 405, which is directly communicating with the cloud front-end 407 generates and sends a search request to the cloud front-end 407 per step 419.

In one embodiment, per step 421 the query generator 201 generates a skyline query that is being sent by the cloud front-end 407, by contextual search platform 11, or a combination thereof, to the cloud backend 409. A skyline query is a query with some boundaries associated to it. The two storages, the binary storage 411 and the structured storage 413 are bound by particular models provided by the model selector 207. As a result, there is a reflective process within the backend 400 environment wherein the models provide boundaries for various storages.

In one embodiment, per step 423 the cloud backend 409 accesses the clustered data of the binary storage, the structured storage, or a combination thereof. Per steps 425 and 427, the models identifying the data are retrieved from analytics 415 by the model selector 207. The models apply overall structure to the binary 411, to the structured data 413, or a combination thereof. The models also identify how the data is related to producing an answer to the query.

In one embodiment, per step 429 the clustered data is updated by the closure generator 209, based on the retrieved models and the response is sent to the front-end 407 per step 431.

In one embodiment, per step 433 the transmission module 205 synchronizes the master data content associated with the query response with the data locally stored on UE 107. In step 435, the device provider 405 confirms the synchronization using the context models 401 of UE 107.

In one embodiment, per step 437 the context model 401 releases the model data of the application 109 to the contextual search platform 103, wherein the contextual search platform 103 binds the models with the contextual data 403 received from cloud front-end 407 as response to the query.

In one embodiment, before providing the response to application 109, the contextual search platform 103 confirms disintegration of the data from contextual components of the cloud 111. In one embodiment, in series of steps 439, 441, 443, 445, and 447 the contextual search platform 103 accesses the contextual models of cloud 111 and retrieves one or more reflective and granular representation of the models. Then contextual data is released. The granular models can be applied independently and therefore enables the UE 107 to apply the models on the received response without having to communicate with the cloud 111.

In one embodiment, per step 449 the retrieved granular context models are applied to the contextual data 403 and in step 451 and 453 the models and the data are synchronized across the UE 107 and cloud 111.

In one embodiment, if the synchronization process shows missing data or information, per steps 455 and 457 the contextual search platform 103 accesses the structured storage 413 and retrieves data. Upon receiving the data, per step 459, 461, 463, the contextual search platform 103 synchronizes the content of UE 107 with the received data of step 457 and confirms the synchronization. Per steps 465 the application 109 is notified by the transmission module 205 of the response to search request 419 being ready. Per step 467, the application 109 retrieves the response form the device provider 405 and presents the response to the user of UE 107.

FIG. 4B is a detailed diagram of steps 419 to 447 which take place within the backend environment 400. In one embodiment, per step 471 the algorithm selector 203 and the model selector 207 associate one or more algorithms, one or more models or a combination thereof to the data retrieved from storages 411, 413 or a combination thereof, as a response to the query generated per step 421 by query generator 201. In step 473 the data is cleaned by the contextual search platform 103 taking into account data partitioning (step 475).

In one embodiment, at every step of the search process, the contextual search platform 103 checks whether the data needs to be transformed. A transformation is performed when, for example, a model, an algorithm, or a combination thereof associated with the data exists in storage 213, in information spaces 113*a*-113*m*, or a combination thereof. The reflective nature of computation closures in computation spaces 115*a*-115*m* provides reflective transformation of query responses provided by the contextual search platform 103.

In one embodiment, the data transformation can be categorized into three groups as Extraction (E), Transformation (T), and Loading (L). Steps 477, 479, and 481 represent various stages of extraction, transformation and loading of the response data. The clustered data, when necessary, is updated with appropriate serialized parts of business context provided by application 109.

In one embodiment, per step 483, updates to the models are applied. For example, if a user of UE 107 downloads a newer version of application 109 with updated models, the updates are applied to models in storage 213, in information spaces, 113a-113m, or a combination thereof, by the contextual search platform 103. The consolidated updates may be propagated from the cloud 111 to UE 107 through updating or fetching the contextual data.

It is noted that the cloud environment discussed here as an environment of distributed information and computation is exemplary and the embodiments discussed above can be implemented on any types of distributed information and computation platforms.

In one embodiment, when a user is searching for traffic status in a M miles stretch along a highway H, the embodiments discussed collects the data just along the highway instead of generating multiple bounding boxes and then aggregating them.

In one embodiment, if there are multiple data requests on the same route (e.g. highway H) for traffic status within or around the same M miles stretch, other clients can use the pre-computed and serialized results from the first client's query. In one embodiment, as described in FIG. 3, the query generator 201 caches at least a portion of at least one query, the one or more algorithms, the result data, or a combination thereof in storage 213. Additionally, the query processing module 211 while processing the subsequent queries from other UEs 107a-107i based, at least in part, on the cached data.

It is noted that, the results from previous queries can be reused because the data is represented based on models in the backend environment. In the above environment, if a new query that is based on a certain model is received and the results have been already computed and cached for that specific model query, then the query processing module 211 can provide the cached results to the new query.

In one embodiment, for the contextual search platform to determine for how long the pre-computed results should be cached and when they can be discarded, various factors can be considered such as, for example, capacity, performance, and power consumption. The analysis of these factors defined for the cached data, can provide insights into whether the data should be saved or discarded.

It is noted that the contextual models can be represented in various formats such as, for example, RDF format including the granularity of computations and data but common denominator will be the least meaningful information set. Important thing about models is the granularity and denomination of models. For example, a traffic-related model may consist of current location of traffic accidents. On the other hand, the binary storage may contain images of the traffic to be tied to the model. Furthermore, the data can be merged by means of geo-tagging mechanisms. In the same manner, the UE 107 may have a simple picture related to the traffic (e.g., the driver using UE 107 may capture a photo by their mobile phone and attach GPS coordinates to the image and share it on the cloud 111. The image provided by the UE 107 may also be merged into the response data.

Figure 5:
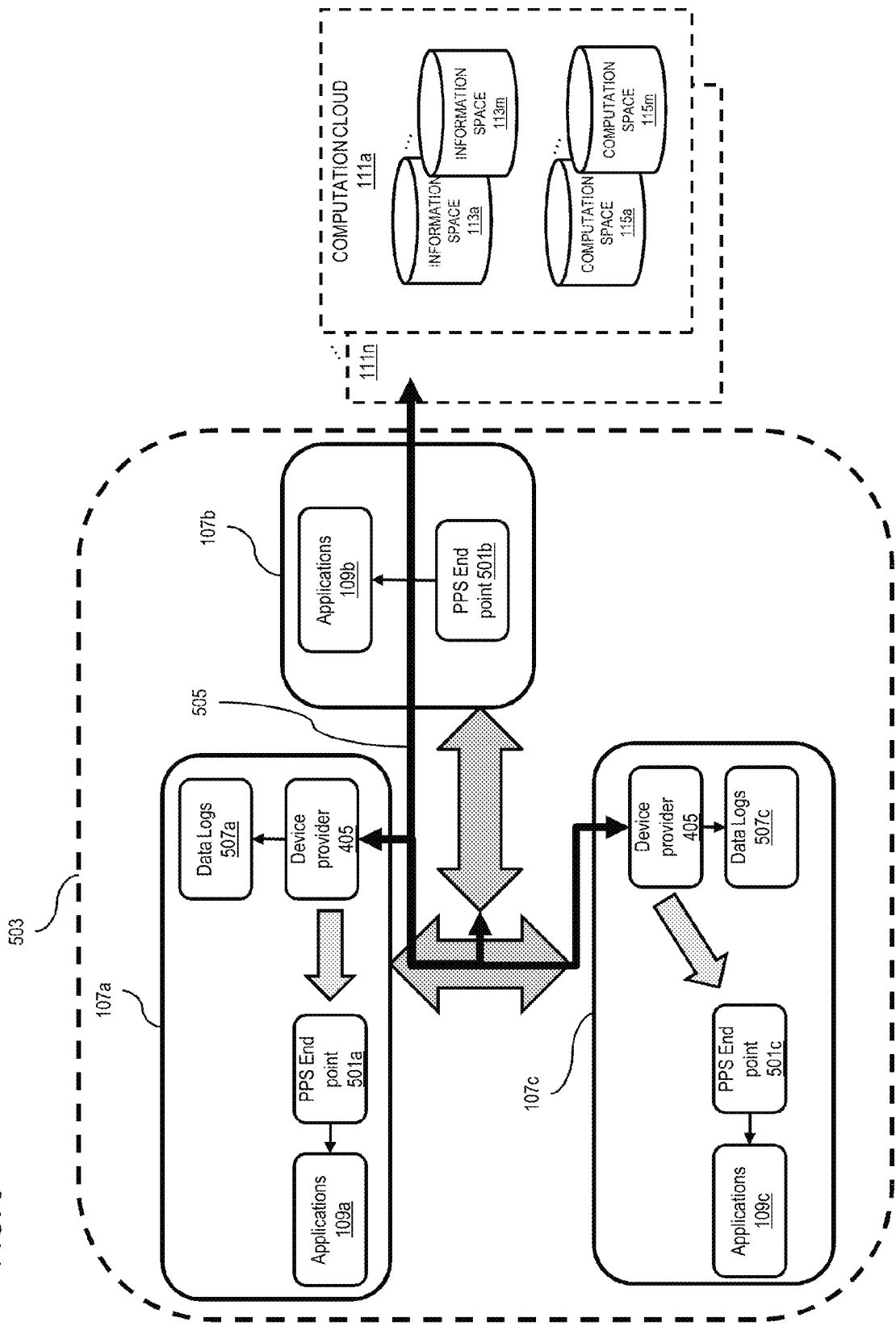
FIG. 5 is a diagram of a personal cloud, according to one embodiment.

FIG. 5 is a diagram of a personal cloud, according to one embodiment. In one embodiment, users own and control all aspects of their own data via interfaces presented on UE 107a-107i, on their own user hosted personal cloud 503 composed on devices 107a-107i associated to the user.

In one embodiment, UEs 107a, 107b, and 107c belong to the same user and in combination provide a personal cloud 503 for the user. A UE 107a or 107c may include data logs 507a and 507c respectively, as part of their storage 507a, and 507c. In this embodiment, UE 107b does not include a data log. Furthermore, a UE 107a-107c may include a collection of applications 109a-109c which may include trusted application such as, for example, a navigation application that functions in accordance with the contextual search platform 103.

In one embodiment, each user has a personal profile stronghold (PPS) that can be accessed by the UE 107a, 107b, or 107c as a website via a URL, by a Uniform Resource Identifier (URI), or a combination thereof via PPS endpoints 501a, 501b, or 501c. The PPS allows the user to select their trusted applications to be included in applications 109a-109c, configure the trusted applications, visualize data collected by the trusted applications, etc.

In one embodiment, a user may set a default as to how they desire to be seen by third party tracking sites, etc. For example, a user may choose to be anonymous (completely invisible to the entities external to the personal cloud 503), pseudo anonymous (anonymous to any entities outside their current session), or fully disclosed (visible to all entities). An anonymous user will be seen as a different person by other entities with each web hit. However, a pseudo anonymous user will be seen as the same person within a session, but not between different sessions. For example, after closing a browser screen and starting a new session other entities are not able to recognize the user as the same user from previous session.

In one embodiment, the applications 109 may include a personal data collector application to collect data from communications between UEs 107a-107c, between UEs 107a-107c and cloud 111, or a combination thereof.

In one embodiment, each application 109 can access a data log 507, extract relevant information and write the extracted information into a local storage unit, an information space 113a-113m, or a combination thereof. Furthermore, the computations associated with personalization process and creation of personal cloud 503 can be decomposed into their elemental computation closures in computation spaces 115a-115m of clouds 111a-111n.

In one embodiment, the stored information on UEs 107a, 107b, and 107c are synchronized with each other and with computation clouds 111a-111n as shown by arrows 505. The synchronization enables the user to run their processes on clouds 111a-111n whenever resources on UEs 107a-107c are insufficient for the personal cloud 503 to perform the required processes.

Figure 6A:
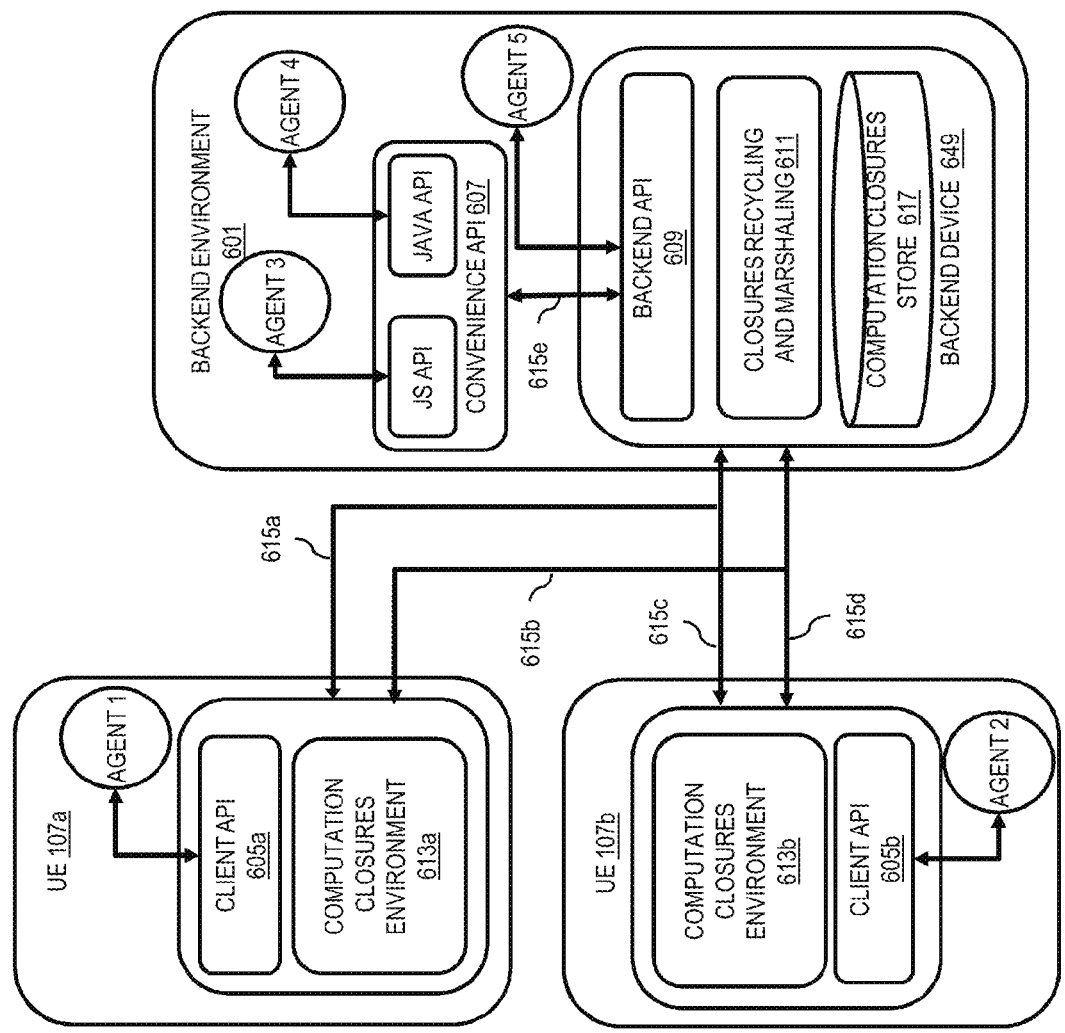
FIGS. 6A-6B are diagrams of computation distribution among devices, according to various embodiments.
Figure 6B:
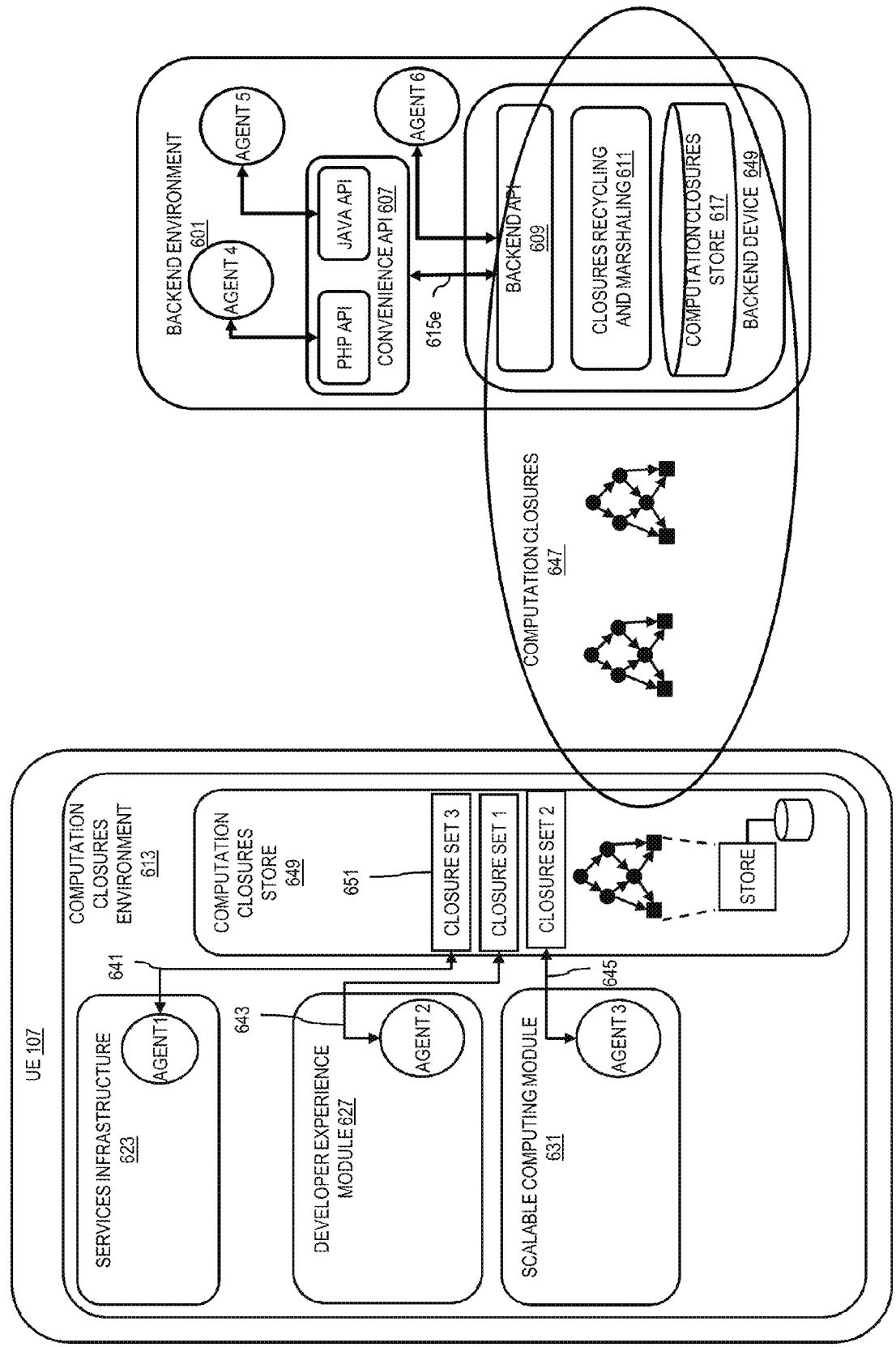

FIGS. 6A-6B are diagrams of computation distribution among devices, according to various embodiments. In one embodiment, in FIG. 6A, the backend environment 601 is a network infrastructure. The backend environment may also be a virtual run-time environment within a cloud 111 associated with the owner of UE 107a or on another UE 107b associated with the user. The backend environment 601 may include one or more components (backend devices) 649 and one or more Application Programming Interface (API) such as a convenience API 607 that may include APIs tailored to the software development environments used (e.g. JAVA, PHP, etc.). Furthermore, UEs 107a and 107b may include client APIs 605a and 605b. Each API enables interaction between devices and components within another device or an environment. For example, backend API 609 enables interaction between the backend device 649 and Agent5, and convenience API 607 enables interaction between the backend device 649 and agents Agent3 and Agent4, wherein each agent is a set of processes that handle computation closures within the backend environment 601. APIs 605a and 605b enable interaction between UE 107a and agent Agent1, and UE 107*b* and agent Agent2 respectively. As seen in the example of FIG. 6A, Agent3 works under PHP while Agent4 is a JAVA process. Each of the UEs 107*a* and 107*b* has a computation closure environment 613*a* and 613*b* which may be part of a cloud 111. Arrows 615*a*-615*e* represent distribution path of computation closures among the environments 613*a*, 613*b* and the computation closures store 617. The computation closures store 617 is a repository of computation closures that can be accessed and used by all the UEs and infrastructure components having connectivity to the backend environment 601.

In one embodiment, the backend device 649 may be equipped with a closure recycling and marshaling component 611 that monitors and manages any access to the computation closures store 617. In other embodiments the closure recycling and marshaling (i.e. standardization for uniform use) may be a function of the contextual search platform 103.

In one embodiment, the computation closures within environments 613*a*, 613*b* and the computation closures store 617 may be composed based on anonymous function objects and automatically created by a compiling system using methods for generating anonymous function objects such as lambda expressions.

FIG. 6B is an expanded view of a computation closure environment 613 as introduced in FIG. 6A. The computation closure environment 613 may be composed of one or more computation closure generating components. In one embodiment the computation closure environment 613 has a services infrastructure 623 that provides various services for the user of the UE 107. The services may include any application that can be performed on the UE 107 such as, games, music, text messaging, voice calls, etc. In one embodiment, the services infrastructure 623 provides support for closure distribution under the supervision of a contextual search platform 103 as discussed in FIG. 1, FIG. 2, and FIG. 3. The agent Agent1 retrieves the computation closures required by the services infrastructure 623 from the computation closures store 649 and stores the newly generated computation closures by the services infrastructure 623 into the computation closures store 649 for distribution purposes per arrow 641.

In another embodiment, the computation closure environment 613 has a developer experience module 627 that provides various tools for a developer for manipulating services offered by the UE 107. The tools may include standardized and/or abstract data types and services allowing the developers to chain processes together across development platforms. In one embodiment, the developer experience module 627 provides cross platform support for abstract data types and services under the supervision of a contextual search platform 103 as discussed in FIG. 1. The agent Agent2 retrieves the computation closures required by the developer experience module 627 from the computation closures store 649 and stores the newly generated computation closures by the developer experience module 627 into the computation closures store 649 for distribution purposes per arrow 643.

In yet another embodiment, the computation closure environment 613 has a scalable computing module 631 that provides an abstract wrapper (i.e. monadic wrapper) for the transmitting closures 651. This abstraction provides computation compatibility between the closure sets 651 and the UE 107. The abstract wrapper may provide scheduling, memory management, system calls and other services for various processes associated with the closures 651. These services are provided under the supervision of the contextual search platform 103 as discussed in FIG. 1. The agent Agent3 retrieves the computation closures required by the scalable computing module 631 from the computation closures store 649 and stores the newly generated computation closures by the scalable computing module 631 into the computation closures store 649 for distribution purposes per arrow 645. In one embodiment, the backend environment 601 may access the computation closures store 649 and exchange/transmit one or more computer closures 647 between the computation closures store 649 and the backend computation closures store 617.

Figure 7A:
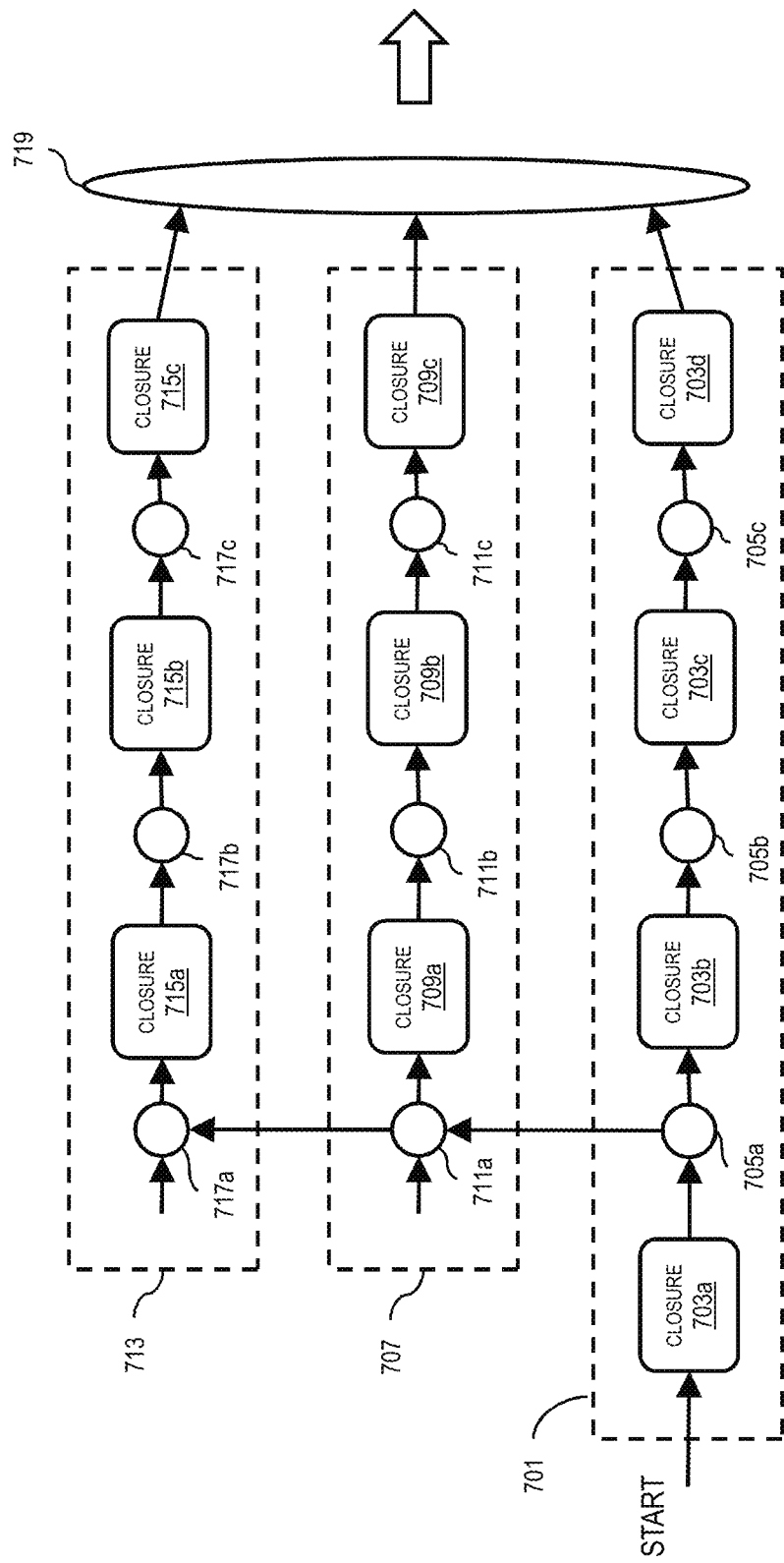
FIGS. 7A-7B are diagrams of computation distribution and load balancing in multi-level computation closure architecture, according to one embodiment.
Figure 7B:
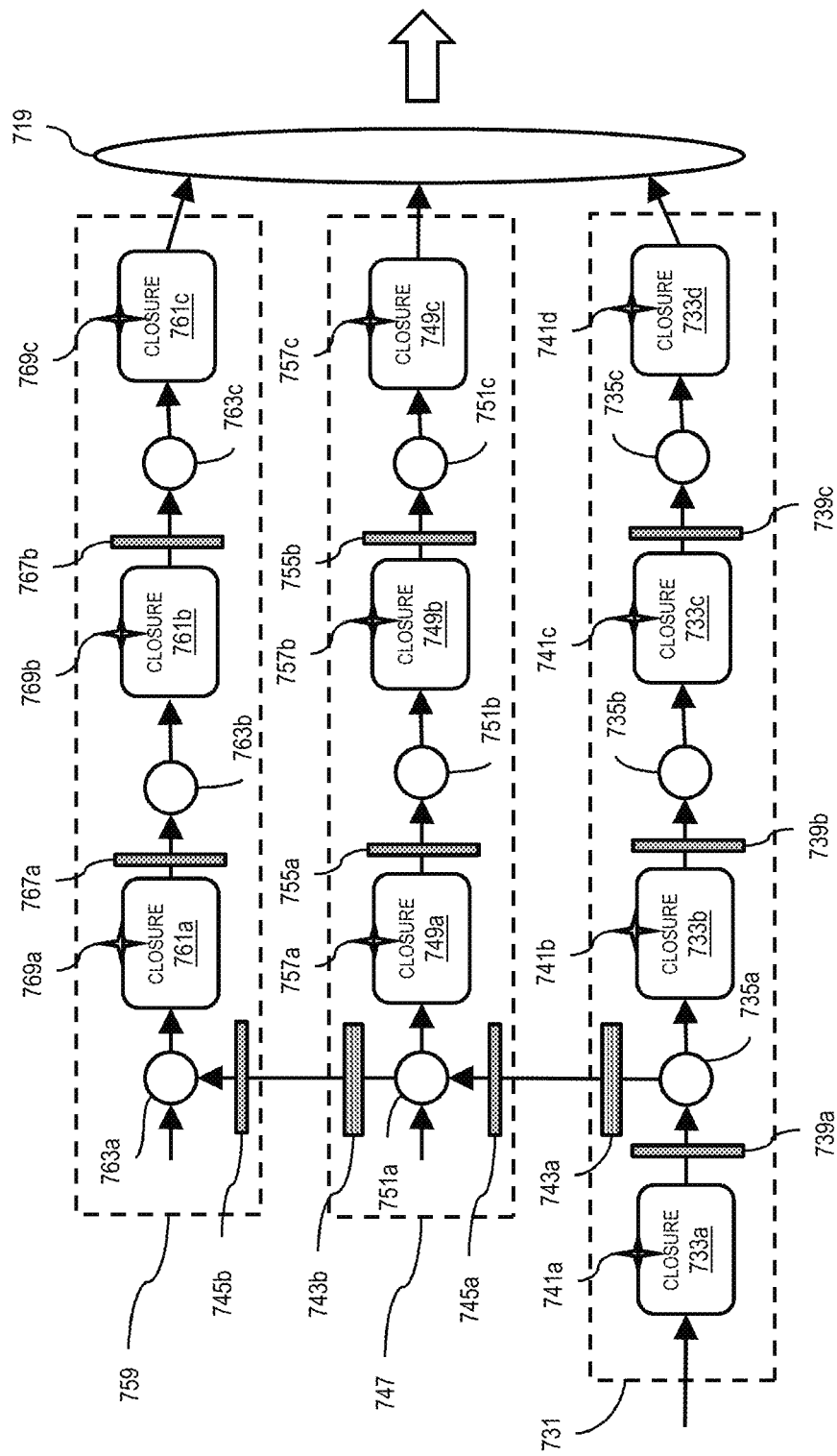

FIGS. 7A-7B are diagrams of computation distribution and load balancing in multi-level computation closure architecture, according to one embodiment. FIG. 7A is a general representation of computation distribution. As seen in FIG. 7A, the computation distribution starts at a component 701 of an architectural level (not shown). Each component may execute a set of closures that constitute a computation branch. For example, the branch 701 is composed of closures 703*a*-703*d*, wherein every two consecutive closures are connected via a connector and computational branches are communicating via connectors as well. For example, connectors 705*a*-705*c* connect closures 703*a*-703*d*. Connectors may also transfer information and data associated with a closure and its execution results to the next closure in the branch or to other branches. Additionally, connectors may function as links between related branches that constitute a distributed computation.

In one embodiment, connectors may contain information about parameters such as capabilities, functional flows, distribution maps, links between closures and architectural levels, etc. Arrows connecting closures to connectors and connectors to next closures show the functional flow adopted based on the parameters. As seen in FIG. 7A, the closures have been distributed from component 701 to component 707 via communication between connector 705*a* and connector 711*a*. The computation branch of component 707 includes closures 709*a*-709*c* communicating via connectors 711*b* and 711*c*, while branches 701 and 707 communicate via connectors 705*a* and 711*a*. Similarly, a third branch 713 has been formed of closures 715*a*-715*c* being executed at component 713 and connected by connectors 717*b* and 717*c*, while the branch communicates with other branches via connector 717*a*. The final results from closure execution of the three branches 701, 707, and 713 are aggregated (719) by the search nodes 117, by applications 109*a*-109*i*, or a combination thereof, and forwarded to the requesting device.

In one embodiment, the initial branch 701 may be in a UE 107*a*-107*i*, the second branch 707 in a component of the infrastructure 117*a*-117*n*, and the third branch in another component of the same infrastructure, a different infrastructure, in a cloud, or a combination thereof.

FIG. 7B shows a computation distribution together with various parameters affecting the distribution. As seen in FIG. 7B, the computation distribution starts at a component 731 of an architectural level (not shown). Each component may execute a set of closures that constitute a computation branch. For example, the branch 731 is composed of closures 741*a*-741*d*, wherein every two consecutive closures are connected via a connector and computational branches are communicating via connectors as well. For example, connectors 735*a*-735*c* connect closures 733*a*-733*d*. Connectors may also transfer information and data associated with a closure and its execution results to the next closure in the branch or to other branches. Additionally, connectors may function as links between related branches that constitute a distributed computation.

In one embodiment, connectors may contain information about parameters such as capabilities, functional flow specifications, distribution maps, links between closures and architectural levels, etc. Arrows connecting closures to connectors and connectors to next closures show the functional flow adopted based on the parameters. For example, star signs 741a-741d, 757a-757c, and 769a-769c may represent capability parameters associated with each closure 733a-733d, 749a-749c, and 761a-761c respectively. Additionally, blocks 739a-739c, 755a-755b, 767a-767b, and 743a-743b may represent cost values. For example, the cost value 739a may show the cost for binding closure 733b to closure 733a and directs closure 733b to branch 731, via connector 735a, as the next closure to be executed after closure 733a. The closures may be initially assigned with priority levels, so that less important closures can be omitted if necessary. Similarly, cost values 739b and 739c direct closures 733c and 733d in branch 731 via connectors 737b and 737c. In a higher level of hierarchy, the cost value 745a directs closures 749a-749c to component 747 and similarly the cost value 745b directs closures 761a-761c to component 759. Additionally in branch 747, connectors 751a-751c and cost values 755a and 755b direct closures 749a-749c down the path of branch 747. Similarly, in branch 759, connectors 763a-763c and cost values 767a and 767b direct closures 761a-761c down the path of branch 759. The final results from closure execution of the three branches 731, 747, and 759 are aggregated (shown by arrow 719) and forwarded to the requesting device.

The processes described herein for providing search with contextual processing may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
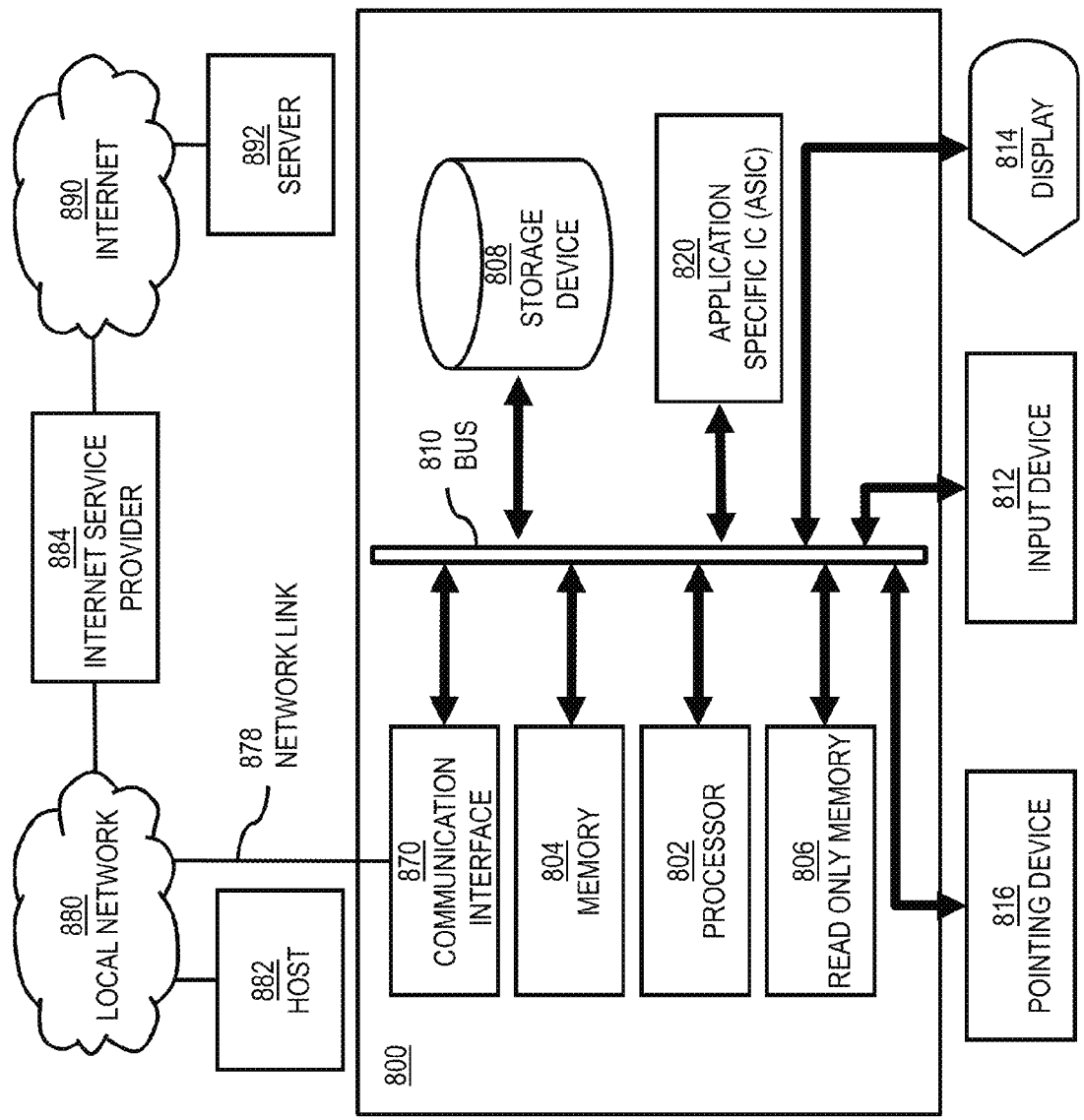
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide search with contextual processing as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing search with contextual processing.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing search with contextual processing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing search with contextual processing. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing search with contextual processing, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing search with contextual processing to the UEs 107a-107i.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide search with contextual processing as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing search with contextual processing.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide search with contextual processing. The memory 905 also stores the data associated with or generated by the execution of the inventive steps.

Figure 10:
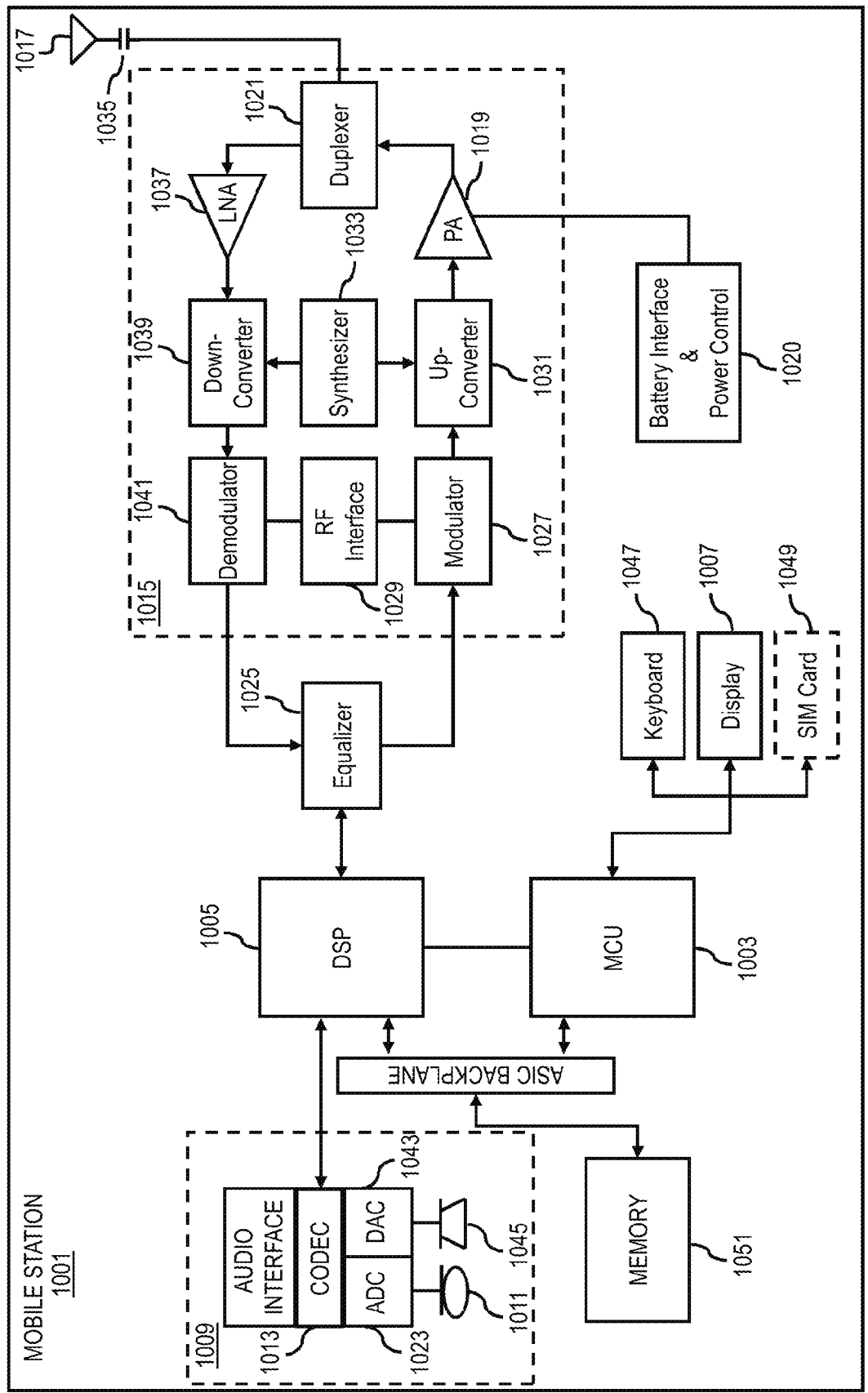
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing search with contextual processing. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing search with contextual processing. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide search with contextual processing. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing by an apparatus one or more data requests to generate at least one query;
   determining, by the apparatus, one or more algorithms for bounding, at least in part, result data responsive to the one or more data requests, the at least one query, or a combination thereof, based, at least in part, on one or more applications, one or more services, or a combination thereof that are associated with the one or more data requests, the at least one query, or a combination thereof;
   causing, at least in part by the apparatus, an association of the one or more algorithms with the at least one query;
   determining, by the apparatus, respective operational granularities of the one or more algorithms; and
   causing, at least in part by the apparatus, a serialization of the one or more algorithms in a semantic web description format based, at least in part, on the respective operational granularities.

2. A method of claim 1, further comprising:
   transmitting the query and the one or more algorithms to a search node to cause, at least in part, an initiation of a processing of the at least one query, the one or more algorithms, or a combination thereof to generate the result data.

3. A method of claim 1, further comprising:
determining one or more models associated with the one or more algorithms for the bounding of the result data,
wherein the one or more models represent, at least in part, one or more data transformations, one or more data extractions, one or more data loadings, or a combination thereof.

4. A method of claim 1, wherein the one or more algorithms are serialized in a resource description framework format, the one or more algorithms provide one or more business contexts associated with the one or more applications, the one or more services, or a combination thereof, and wherein the bounding of the result data is further based, at least in part, on the one or more business contexts.

5. A method of claim 4, further comprising:
causing, at least in part, a representation of the at least one query, the one or more algorithms, the one or more business contexts, or a combination thereof as one or more computation closures in the semantic web description format.

6. A method of claim 5, further comprising:
determining respective other operational granularities of the one or more business contexts; and
causing, at least in part, a serialization of the one or more business contexts based, at least in part, on the respective other operational granularities.

7. A method of claim 5, wherein the one or more computation closures comprise one or more functional flows defining, at least in part, the one or more applications, the one or more services, or a combination thereof.

8. A method of claim 1, further comprising:
causing, at least in part, a caching of at least a portion of the at least one query, the one or more algorithms, the result data, or a combination thereof; and
processing one or more subsequent queries based, at least in part, on the caching.

9. A method of claim 1, wherein the at least one query is a geo-spatial search query.

10. An apparatus comprising:
at least one processor; and
at least one memory including computer program code for one or more programs,
the at least one memory and the computer program code configured to, with the at least one processor, cause the apparatus to perform at least the following,
process and/or facilitate a processing of one or more data requests to generate at least one query;
determine one or more algorithms for bounding, at least in part, result data responsive to the one or more data requests, the at least one query, or a combination thereof, based, at least in part, on one or more applications, one or more services, or a combination thereof that are associated with the one or more data requests, the at least one query, or a combination thereof;
cause, at least in part, an association of the one or more algorithms with the at least one query;
determine respective operational granularities of the one or more algorithms; and
cause, at least in part, a serialization of the one or more algorithms in a semantic web description format based, at least in part, on the respective operational granularities.

11. An apparatus of claim 10, wherein the apparatus is further caused to:
cause, at least in part, a transmission of the query and the one or more algorithms to a search node to cause, at least in part, an initiation of a processing of the at least one query, the one or more algorithms, or a combination thereof to generate the result data.

12. An apparatus of claim 10, wherein the apparatus is further caused to:
determine one or more models associated with the one or more algorithms for the bounding of the result data,
wherein the one or more models represent, at least in part, one or more data transformations, one or more data extractions, one or more data loadings, or a combination thereof.

13. An apparatus of claim 10, wherein the one or more algorithms provide one or more business contexts associated with the one or more applications, the one or more services, or a combination thereof, and wherein the bounding of the result data is further based, at least in part, on the one or more business contexts.

14. An apparatus of claim 13, wherein the apparatus is further caused to:
cause, at least in part, a representation of the at least one query, the one or more algorithms, the one or more business contexts, or a combination thereof as one or more computation closures in the semantic web description format.

15. An apparatus of claim 14, wherein the apparatus is further caused to:
determine respective other operational granularities of the one or more business contexts; and
cause, at least in part, a serialization of the one or more business contexts based, at least in part, on the respective other operational granularities.

16. An apparatus of claim 14, wherein the one or more computation closures comprise one or more functional flows defining, at least in part, the one or more applications, the one or more services, or a combination thereof.

17. An apparatus of claim 10, wherein the apparatus is further caused to:
cause, at least in part, a caching of at least a portion of the at least one query, the one or more algorithms, the result data, or a combination thereof; and
process and/or facilitate a processing of one or more subsequent queries based, at least in part, on the caching.

18. An apparatus of claim 10, wherein the at least one query is a geo-spatial search query.

* * * * *